US011968350B2

United States Patent
Uehara

(10) Patent No.: US 11,968,350 B2
(45) Date of Patent: Apr. 23, 2024

(54) LENS APPARATUS AND IMAGE PICKUP APPARATUS

(71) Applicant: CANON KABUSHIKI KAISHA, Tokyo (JP)

(72) Inventor: Takumi Uehara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 19 days.

(21) Appl. No.: 17/478,774

(22) Filed: Sep. 17, 2021

(65) Prior Publication Data
US 2022/0007002 A1 Jan. 6, 2022

Related U.S. Application Data

(63) Continuation of application No. PCT/JP2020/011308, filed on Mar. 13, 2020.

(30) Foreign Application Priority Data

Mar. 18, 2019 (JP) ................................ 2019-049394

(51) Int. Cl.
*H04N 13/207* (2018.01)
*G02B 7/12* (2021.01)
(Continued)

(52) U.S. Cl.
CPC ............. *H04N 13/207* (2018.05); *G02B 7/12* (2013.01); *G03B 17/14* (2013.01); *G03B 35/10* (2013.01)

(58) Field of Classification Search
CPC .......... G02B 23/18; G02B 7/12; G03B 17/14; G03B 35/10; H04N 13/207; H04N 13/218; H04N 13/296
(Continued)

(56) References Cited

U.S. PATENT DOCUMENTS

| | | | |
|---|---|---|---|
| 2009/0170042 A1* | 7/2009 | Kanda | G03B 27/54 355/70 |
| 2016/0134802 A1* | 5/2016 | Inoue | H04N 5/232123 348/349 |
| 2021/0306609 A1* | 9/2021 | Pacala | G02B 27/46 |

FOREIGN PATENT DOCUMENTS

| | | |
|---|---|---|
| CN | 1131753 A | 9/1996 |
| CN | 107040708 A | 8/2017 |

(Continued)

OTHER PUBLICATIONS

PCT/IB/338 (PCT Notification of Transmittal of Copies of Translation of the International Preliminary Report on Patentability); PCT/IB/373 (PCT International Preliminary Report on Patentability); PCT/ISA/237 (PCT Written Opinion of the International Searching Authority).

(Continued)

*Primary Examiner* — Behrooz M Senfi
(74) *Attorney, Agent, or Firm* — Cowan, Liebowitz & Latman, P.C.

(57) ABSTRACT

A lens apparatus includes a first optical system, and a second optical system disposed in parallel with the first optical system. Each of the first optical system and the second optical system includes, in order from an object side to an image side, a first optical axis, a second optical axis, and a third optical axis. When each of the first optical system and the second optical system rotates around an axis parallel to the third optical axis, a distance between first optical axes of the first optical system and the second optical system changes greater than a distance between third optical axes.

14 Claims, 4 Drawing Sheets

(51) Int. Cl.
*G03B 17/14* (2021.01)
*G03B 35/10* (2021.01)

(58) Field of Classification Search
USPC .......................................................... 348/42
See application file for complete search history.

(56) References Cited

FOREIGN PATENT DOCUMENTS

| | | | | |
|---|---|---|---|---|
| JP | 2002-156584 A | 5/2002 | | |
| JP | 2008-233579 A | 10/2008 | | |
| JP | 2009-210957 A | 9/2009 | | |
| JP | 2010092028 A | * 4/2010 | ............. | G03B 13/02 |
| JP | 2011-205558 A | 10/2011 | | |
| JP | 2011205558 A | * 10/2011 | ............. | H04N 13/02 |
| JP | 2011-257633 A | 12/2011 | | |
| JP | 2011257633 A | * 12/2011 | ............. | G03B 35/10 |
| JP | 2012-113281 A | 6/2012 | | |
| JP | 2013-057698 A | 3/2013 | | |
| JP | 2013057698 A | * 3/2013 | ........... | G02B 15/163 |
| WO | WO-2012165491 A1 | * 12/2012 | ............. | G01B 11/03 |

OTHER PUBLICATIONS

International Search Report dated Jun. 9-10, 2020 of the corresponding International Application, PCT/JP2020/011308 dated Mar. 13, 2020.
A May 30, 2022 Chinese Office Action, with an English Translation, that issued in Chinese Patent Application No. 202080021505.X.

* cited by examiner

LENS APPARATUS AND IMAGE PICKUP APPARATUS

CROSS-REFERENCE TO RELATED APPLICATIONS

This application is a Continuation of International Patent Application No. PCT/JP2020/011308, filed on Mar. 13, 2020, which claims the benefit of Japanese Patent Application No. 2019-049394, filed on Mar. 18, 2019, both of which are hereby incorporated by reference herein in their entirety.

BACKGROUND OF THE INVENTION

Field of the Invention

The present invention relates to a lens apparatus for three-dimensional imaging.

Description of the Related Art

There has conventionally been known a lens apparatus that includes two sets of optical systems arranged in parallel and configured to form two images on a single image sensor. In this lens apparatus, images having a parallax are projected on a right eye and a left eye depending on a baseline length, so that an observer can acquire a three-dimensional effect. The longer the baseline length is, the more strongly the observer feels the three-dimensional effect. In order to change the baseline length, it is necessary to change a distance between the right optical system and the left optical system. When images of the two optical systems are formed side by side on the single image sensor, the images cannot be separated beyond the light receiving range of the image sensor, and the two images cannot be close to each other so as to overlap each other.

Japanese Patent Laid-Open No. 2012-113281 discloses a three-dimensional imaging optical system that can change the baseline length by decentering relative to their optical axes and narrowing the diaphragms in the right-eye and left-eye optical systems, without moving the positions of the two images arranged on the image sensor.

The three-dimensional imaging optical system disclosed in Japanese Patent Laid-Open No. 2012-113281 cannot change the baseline length while the diaphragm is open. In addition, in this three-dimensional imaging optical system, a variable range of the baseline length is limited to a range of the open diameter of the diaphragm.

SUMMARY OF THE INVENTION

The present invention provides a lens apparatus and an image pickup apparatus, each of which can change a baseline length in a wide range.

A lens apparatus according to one aspect of the present invention includes a first optical system, and a second optical system disposed in parallel with the first optical system. Each of the first optical system and the second optical system includes, in order from an object side to an image side, a first optical axis, a second optical axis, and a third optical axis. When each of the first optical system and the second optical system rotates around an axis parallel to the third optical axis, a distance between first optical axes of the first optical system and the second optical system changes greater than a distance between third optical axes.

An image pickup apparatus according to another aspect of the present invention includes the lens apparatus and a camera body configured to hold an image sensor.

Further features of the present invention will become apparent from the following description of exemplary embodiments with reference to the attached drawings.

DESCRIPTION OF THE EMBODIMENTS

Figure 1:
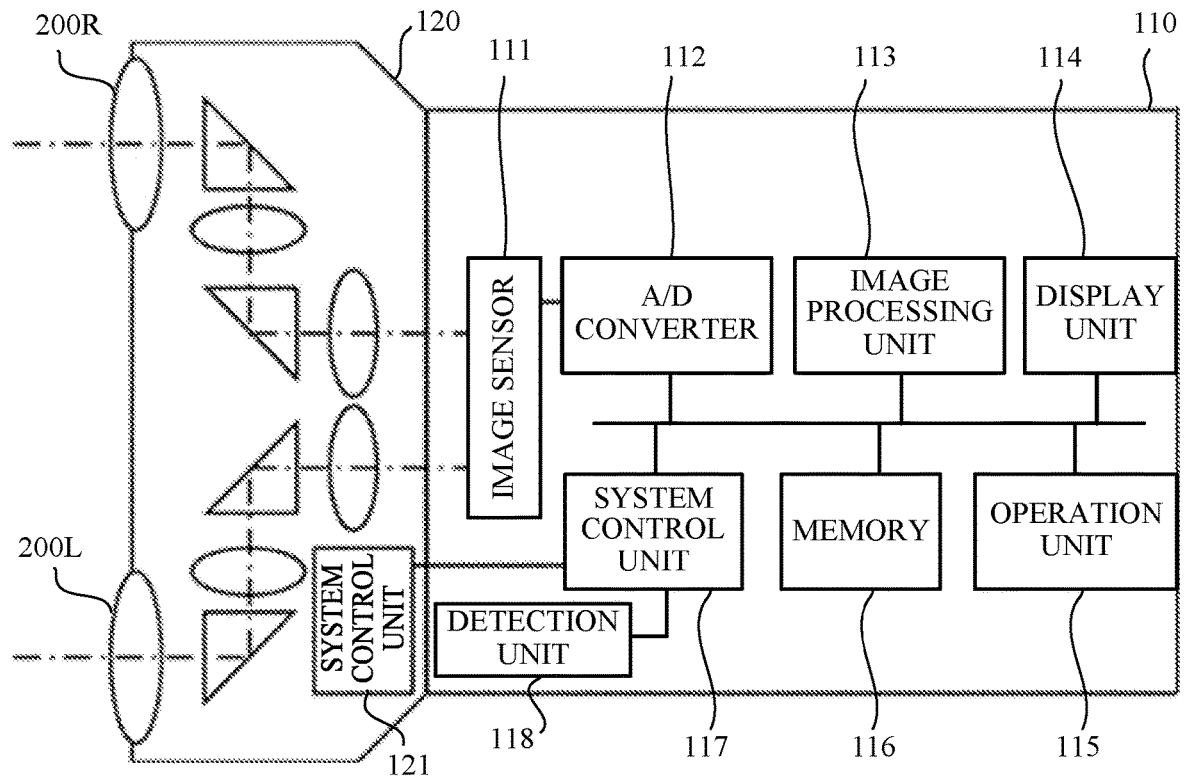
FIG. 1 is a schematic view of an image pickup apparatus according to this embodiment.

Referring now to the drawings, a detailed description will be given of embodiments according to the present invention.

Referring now to FIG. 1, a description will be given of an image pickup apparatus according to this embodiment. FIG. 1 is a schematic view of an image pickup apparatus 100, The image pickup apparatus 100 can capture a three-dimensional image. The image pickup apparatus 100 includes a camera body 110 and a lens apparatus 120. The lens apparatus 120 is an interchangeable lens that is attachable to and detachable from the camera body 110. However, the present invention is not limited to this embodiment, and is applicable to an image pickup apparatus in which the camera body 110 and the lens apparatus 120 are integrated with each other.

The lens apparatus 120 includes a right-eye optical system (first optical system) 200R, a left-eye optical system (second optical system) 200L, and a system control unit (lens system control unit) 121. The camera body 110 includes an image sensor 111, an A/D converter 112, an image processing unit 113, a display unit 114, an operation unit 115, a memory 116, a system control unit (camera system control unit) 117, and a detection unit (detection means) 118. The detection unit 118 may be provided in the lens apparatus 120. When the lens apparatus 120 is attached to the camera body 110, the system control unit 117 of the camera body 110 and the system control unit 121 of the lens apparatus 120 are electrically connected to each other.

Object image includes a right-eye image (first image) formed through the right-eye optical system 200R and a left-eye image (second image) formed through the left-eye optical system 200L, and are arranged on the image sensor 111. The image sensor ill converts the imaged object image (optical signal) into an analog electric signal. The AID converter 112 converts the analog electric signal output from the image sensor 111 into a digital electric signal (image signal). The image processing unit 113 performs various image processing for the digital electric signal (image signal) output from the AID converter 112.

The display unit 114 displays various types of information. The display unit 114 is implemented, for example, by using an electronic viewfinder or a liquid crystal panel. The operation unit 115 serves as a user interface for the user to give an instruction to the image pickup apparatus 100. When the display unit 114 has a touch panel, the touch panel also constitutes one of the operation units 115. The memory 116 stores various data such as image data that has been processed by the image processing unit 113. The memory 116 stores the program. The memory 116 is implemented, for example, by using a ROM, a RAM, and an HDD. The system control unit 117 controls the entire image pickup apparatus 100 in an integrated manner. The system control unit 117 is implemented, for example, by using a CPU.

Figure 2:
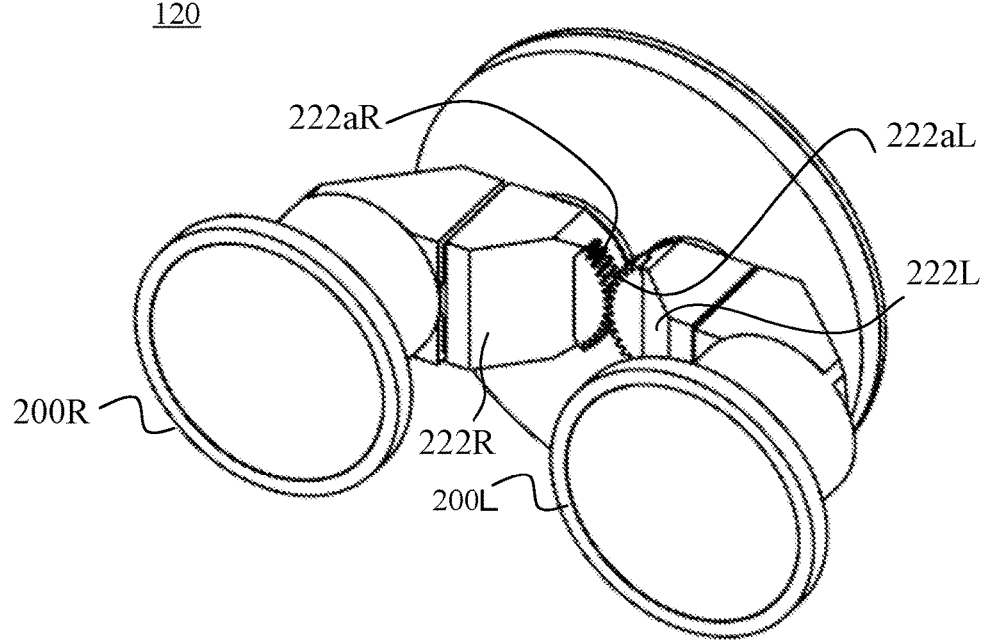
FIG. 2 is a perspective view of a lens apparatus according to this embodiment.
Figure 3:
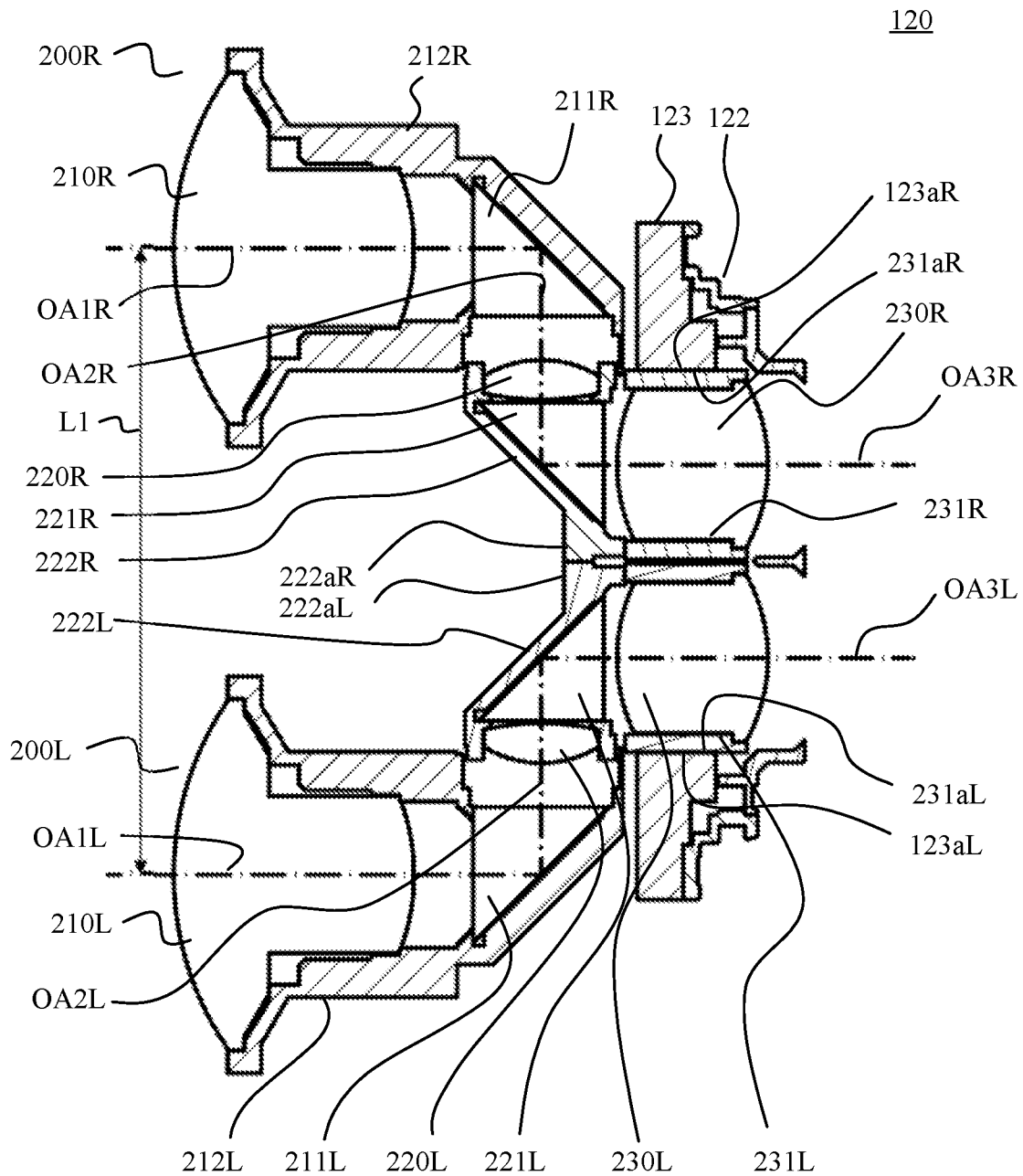
FIG. 3 is a sectional view of the lens apparatus according to this embodiment.

Referring now to FIGS. 2 and 3, a description will be given of the configuration of the lens apparatus 120. FIG. 2 is a perspective view of the lens apparatus 120. FIG. 3 is a sectional view of the right-eye optical system 200R and the left-eye optical system 200L. In the following description, R is added to the end of the reference numeral in the description of the right-eye optical system, and L is added to the end of the reference numeral in the description of the left-eye optical system. Neither R nor L is added to the end of the reference numeral in the description common to both the right-eye optical system and the left-eye optical system.

The lens apparatus 120 has the right-eye optical system 200R and the left-eye optical system 200L. The right-eye optical system 200R and the left-eye optical system 200L include, in order from the object side to the image side, first optical axis OA1R and OA1L, and second optical axis OA2R and OA2L substantially orthogonal to the first optical axis, and third optical axes OA3R and OA3L parallel to the first optical axis. The right-eye optical system 200R and the left-eye optical system 200L include first lenses 210R and 210L, second lenses 220R and 220L, and third lenses 230R and 230L, respectively, along each optical axis. The right-eye optical system 200R and the left-eye optical system 200L have first prisms 211R and 211L and second prisms 221R and 221L, respectively. The first prisms 211R and 211L deflect the light beams along the first optical axes OA1R and OA1L and guide them to the second optical axes OA2R and OA2L, respectively. The second prisms 221R and 221L deflect the light beams along the second optical axes OA2R and OA2L and guide them to the third optical axes OA3R and OA3L, respectively.

On the image sensor 111 in the camera body 110, a right-eye image circle ICR imaged by the right-eye optical system 200R and a left-eye image circle ICL imaged by the left-eye optical system 200L are formed in parallel. It is possible to set the sizes of the image circles ICR and ICL and a separation distance between the image circles ICR and ICL so that the image circles ICR and ICL do not overlap each other. For example, consider an area in which the light receiving range of the image sensor 111 is divided into left and right halves with respect to the center. It is possible to set the center of the right-eye image circle ICR to the approximately center of the right area of the light receiving range, and to set the center of the left-eye image circle ICL to be the approximately center of the left area of the light receiving range.

A distance between the first optical axis OMR of the right-eye optical system 200R and the first optical axis OA1L of the left-eye optical system 200L will be referred to as a baseline length L1. The longer the baseline length L1 is, the greater the three-dimensional effect during observing is. However, if the baseline length L1 exceeds approximately 1/20 of the object distance, the three-dimensional effect may become too strong. Therefore, when the object distance is short, the baseline length L1 may be short.

A detailed description will be given of a method of changing the baseline length L1. The right-eye optical system 200R and the left-eye optical system 200L have first lens holding members 212R and 212L, second lens holding members 222R and 222L, and third lens holding members 231R and 231L, respectively. The first lens holding members 212R and 212L hold the first lenses 210R and 210L and the first prisms 211R and 211L, respectively. The second lens holding members 222R and 222L hold the second lenses 220R and 220L and the second prisms 221R and 221L, respectively. The second lens holding members 222R and 222L constitute a first rotating mechanism for the right-eye optical system 200R and a second rotating mechanism for the left-eye optical system 200L, respectively. The third lens holding members 231R and 231L hold the three-lenses 230R and 230L, respectively. The right-eye optical system 200R and the left-eye optical system 200L are fixed to a lens base 123, respectively. The lens base 123 is fixed to a lens mount unit 122 for connecting the lens apparatus 120 to the camera body 110.

The right-eye optical system 200R and the left-eye optical system 200L are configured to be rotatable around the third optical axes OA3R and OA3L, respectively. In this embodiment, the outer peripheral portions 231aR and 231aL of the third lens holding members 231R and 231L are fitted to the circumferential surfaces 123aR and 123aL centered on the third optical axes OA3R and OA3L of the lens base 123. When the right-eye optical system 200R and the left-eye optical system 200L rotate about the third optical axes OA3R and OA3L, the image circles ICR and ICL on the image sensor 111 do not move, and the positions of the first optical axes OA1R and OA1L move, Therefore, when the right-eye optical system 200R and the left-eye optical system 200L are rotated in opposite directions by the same angle, the baseline length L1 can be changed while the first optical axes OA1R and OA1L of the right-eye optical system 200R and the left-eye optical system 200L maintain a side-by-side relationship.

As illustrated in FIG. 2, the second lens holding members 222R and 222L of the right-eye optical system 200R and the left-eye optical system 200L are connected to each other at gears 222aR and 222aL provided on the second lens holding members 222R and 222L, respectively. Thereby, the right-eye optical system 200R and the left-eye optical system 200L can be reliably rotated by the same angle in opposite directions.

Figure 4A:
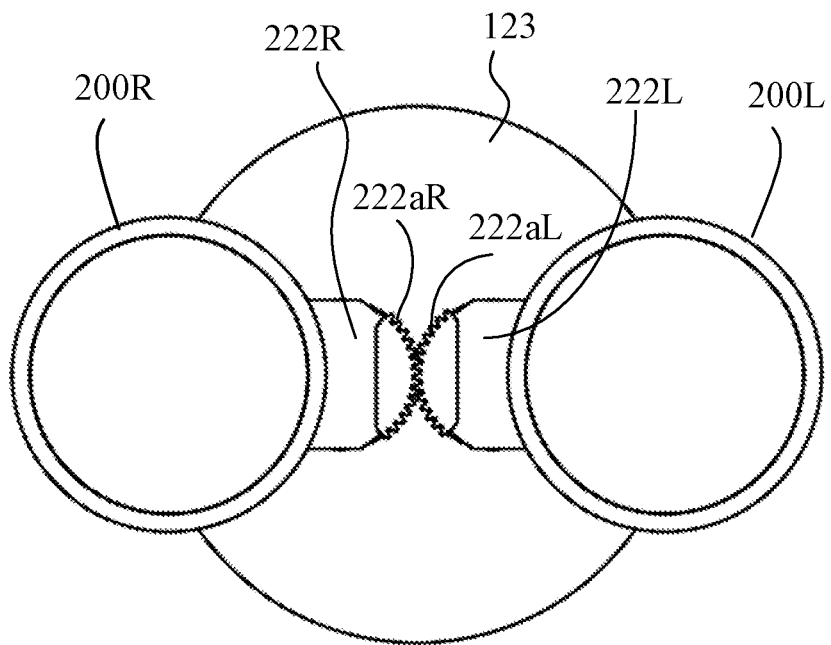
FIGS. 4A and 4B explain the lens apparatus while a baseline length is long in this embodiment.
Figure 4B:
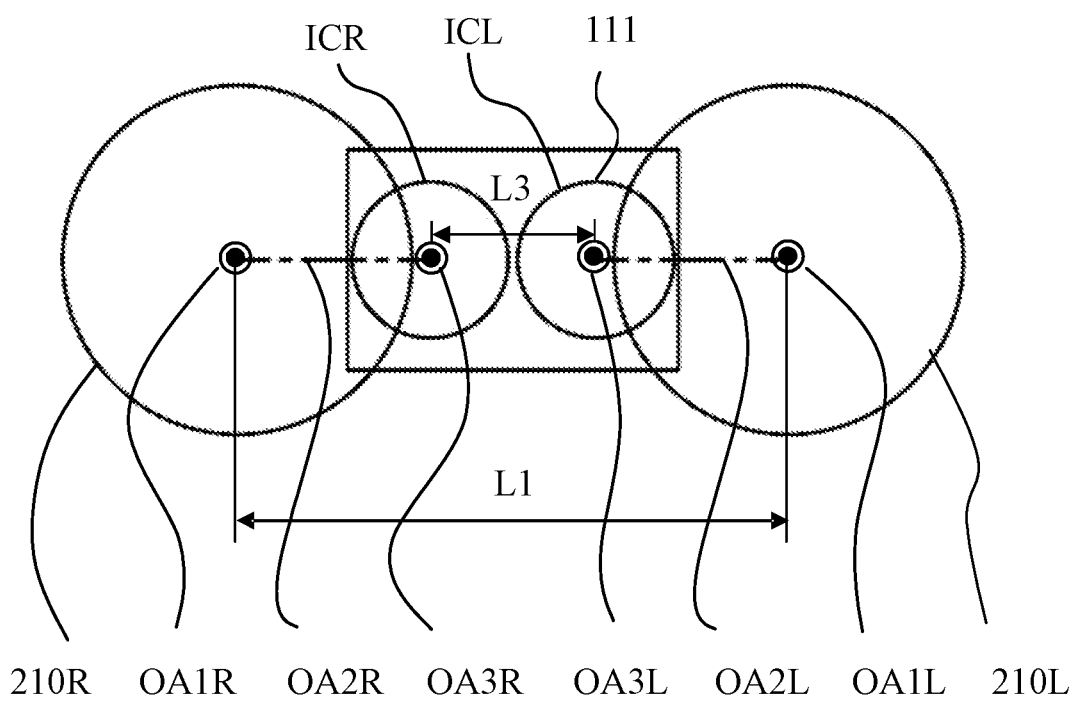
Figure 5A:
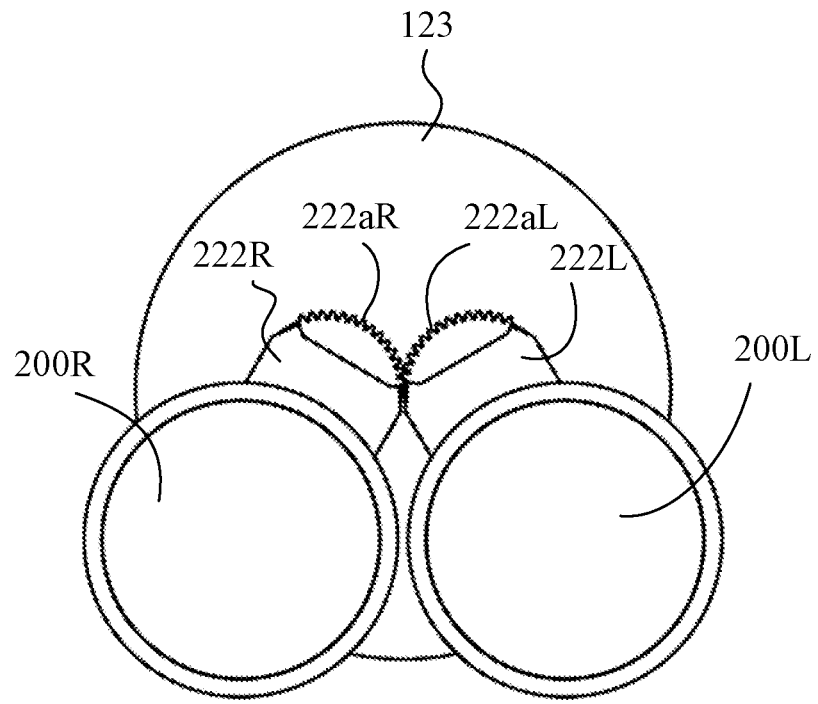
FIGS. 5A and 5B explain the lens apparatus while a baseline length is short in this embodiment.
Figure 5B:
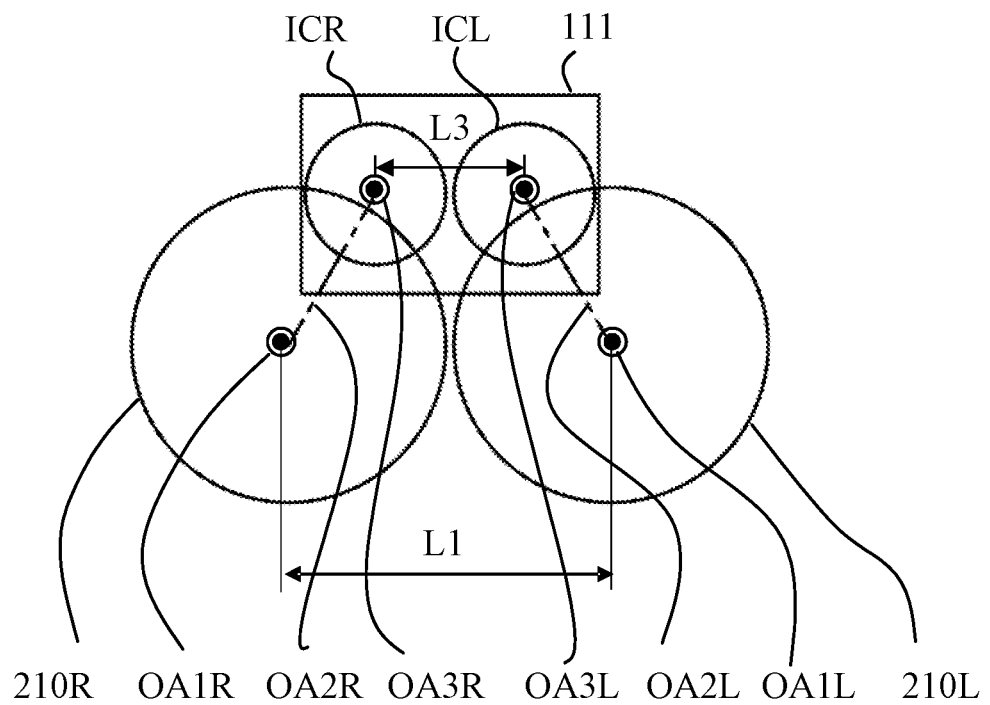

FIGS. 4A and 4B explain the lens apparatus 120 while the baseline length L1 is long. FIG. 4A is a front view of the lens apparatus 120 viewed from the object side, and FIG. 4B illustrates positions of the first optical axes OA1R and OA1L, the second optical axes OA2R and OA2L, the third optical axes OA3R and OA3L, and the image circles ICR and ICL. FIGS. 5A and 5B explain the lens apparatus 120 while the baseline length L1 is short. FIG. 5A is a front view of the lens apparatus 120 viewed from the object side, and FIG. 5B illustrates positions of the first optical axes OA1R and OA1L, the second optical axes OA2R and OA2L, the third optical axes OA3R and OA3L, and the image circles ICR and ICL. FIGS. 5A and 5B illustrate that the right-eye optical system 200R and the left-eye optical system 200L are rotated around the third optical axes OA3R and OA3L, respectively, and that the baseline length L1 is shorter between the first optical axes OA1R and OA1L than that of FIGS. 4A and 4B.

When FIGS. 4A, 4B, 5A and 5B are compared with each other, the second optical axes OA2R and OA2L, extend in the horizontal direction in FIGS. 4A and 4B, whereas the second optical axes OA2R and OA2L are arranged diagonally in FIGS. 5A and 5B. FIGS. 5A and 5B illustrate the baseline length L1 shorter than that of FIGS. 4A and 4B. Since the third optical axes OA3R and OA3L are rotation centers, the third optical axes OA3R and OA3L do not move or the image circles ICR and ICL do not move either. Since the image circles ICR and ICL do not move, even if the baseline length L1 is changed, the image circles ICR and ICL are never located outside the light receiving range of the image sensor 111 or the image circles ICR and ICL for the right eye and the left eye never overlap each other. For example, assume that the image sensor 111 has a size of 24 mm in length×36 mm in width, the diameters of the image circles ICR and ICL are φ17 mm, the separation distance between the third optical axes OA3R and OA3L is 18 mm, and the lengths of the second optical axes OA2R and OA2L are 21 mm. When the right-eye optical system 200R and the left-eye optical system 200L are arranged so that the second optical axes OA2R and OA2L extend in the horizontal direction, the baseline length L1 illustrated in FIGS. 4A and 4B is 60 mm, which is approximately equal to the eye width of an adult. When each of the right-eye optical system 200R and the left-eye optical system 200L is rotated by 60 degrees around the third optical axes OA3R and OA3L from this state, the baseline length L1 is reduced down to about 39 mm as illustrated in FIGS. 5A and 5B.

In this embodiment, the right-eye optical system 200R and the left-eye optical system 200L rotate around the third optical axes OA3R and OA3L, respectively (while the rotation centers coincide with the third optical axes OA3R and OA3L), but the present invention is not limited to this embodiment. The right-eye optical system 200R and the left-eye optical system 200L rotate around axes parallel to the third optical axes OA3R and OA3L, respectively, so that the baseline length L1 (distance between the first optical axes) changes greater than the distance L3 between the third optical axes. That is, as long as the rotation centers are located near the third optical axes OA3R and OA3L, the distance between the first optical axes OA1R and OA1L (baseline L1) changes greater than the distance between the third optical axes OA3R and OA3L when the ratio of the rotation radii is considered. If the separation distance between the image circles ICR and ICL and the recording pixel range of each of the right eye and the left eye relative to the light receiving range of the image sensor 111 have margin amounts, the right-eye optical system 200R and the left-eye optical system 200L are rotated, respectively, to change the baseline length L1.

When the rotation centers are set at positions away from the third optical axes OA3R and OA3L and the right-eye optical system 200R and the left-eye optical system 200L are rotated, the positions of the image circles ICR and ICL move on the image sensor 111. In that case, the recording pixel range may be moved according to the moving amounts of the image circles ICR and ICL. Alternatively, the moving amounts of the image circles ICR and ICL may be recorded as data, and the position of the image circles may be added as metadata to the data file for storing the still image data and the motion image data.

The positions of the third optical axes OA3R and OA3L can be calculated from the design positions and rotating amounts of the respective rotation axes of the right-eye optical system 200R and the left-eye optical system 200L. For example, a potentiometer can be used as the rotating amount detection unit (detection means) 118. The system control unit (control means) 117 can move the recording pixel range of the image sensor 311 based on the positions of the third optical axes OA3R and OA3L. The positions of the third optical axes OA3R and OA3L may be replaced with the light intensity centers of the image circles ICR and ICL. The light intensity centers of the image circles ICR and ICL can be obtained from the luminance distribution of the image sensor 111.

Thus, in this embodiment, the lens apparatus 120 has a first optical system (right-eye optical system 200R) and a second optical system (left-eye optical system 200L) arranged in parallel with the first optical system. The first optical system and the second optical system have, in order from the object side to the image side, first optical axes OA1R and OA1L, second optical axes OA2R and OA2L, and third optical axes OA3R and OA3L, respectively. When the first optical system and the second optical system are rotated around the axes parallel to the third optical axes, the distance (base line length L1) between the first optical axes of the first optical system and the second optical system changes greater than the distance L3 between the third optical axes.

The first optical system and the second optical system may be optical systems that deflect the incident light beams twice. The second optical axis may be orthogonal to the first optical axis. The third optical axis may be parallel to the first optical axis. The first optical system and the second optical system may rotate around the third optical axes to change the distance between the first optical axes. The first rotating amount of the first optical system and the second rotating amount of the second optical system may be the same angles in opposite directions.

The lens apparatus may include the first rotating mechanism (second lens holding member 222R) for the first optical system, the second rotating mechanism (second lens holding member 222L) for the second optical system, and gears (222aR, 222aL) that connect the first rotating mechanism and the second rotating mechanism to each other. The lens apparatus may be a three-dimensional imaging lens apparatus that can capture two images having a parallax using the first optical system and the second optical system.

The image sensor 111 may be a single image sensor that images the first image formed by the first optical system and the second image formed by the second optical system in parallel. The image pickup apparatus 100 may include a detection means (detection unit 118) for detecting the position of the third optical axis and a control means (system control unit 117) for moving the recording pixel range of the image sensor based on the position of the third optical axis.

This embodiment can provide a lens apparatus and an image pickup apparatus, each of which can change the baseline length in a wide range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A lens apparatus attachable to a camera body, the lens apparatus comprising:
   a first optical system; and
   a second optical system disposed in parallel with the first optical system; and
   a lens mount unit configured to be attachable to and detachable from the camera body including an image sensor,
   wherein each of the first optical system and the second optical system includes, in order from an object side to an image side, a first optical axis, a second optical axis, and a third optical axis, wherein when each of the first optical system and the second optical system rotates around the third optical axis, a distance between first optical axes of the first optical system and the second optical system changes greater than a distance between third optical axes, and wherein a minimum value of the distance between the first optical axis of the first optical system and the first optical axis of the second optical system is larger than the distance between the third optical axis of the first optical system and the third optical axis of the second optical system.

2. The lens apparatus according to claim 1, wherein each of the first optical system and the second optical system is an optical system that deflects an incident light beam twice.

3. The lens apparatus according to claim 1, wherein the second optical axis is orthogonal to the first optical axis.

4. The lens apparatus according to claim 1, wherein the third optical axis is parallel to the first optical axis.

5. The lens apparatus according to claim 1, wherein a first rotating amount of the first optical system and a second rotating amount of the second optical system have the same angles in opposite directions.

6. The lens apparatus according to claim 1, further comprising:
a first rotating mechanism of the first optical system;
a second rotating mechanism of the second optical system; and
a gear configured to connect the first rotating mechanism and the second rotating mechanism to each other.

7. The lens apparatus according to claim 1, wherein the lens apparatus is a three-dimensional imaging lens apparatus configured to form two images having a parallax using the first optical system and the second optical system.

8. An image pickup apparatus comprising:
the lens apparatus according to claim 1; and
a camera body configured to hold an image sensor.

9. The image pickup apparatus according to claim 8, wherein the image sensor is a single image sensor configured to image a first image formed by the first optical system and a second image formed by the second optical system in parallel.

10. The image pickup apparatus according to claim 8, wherein the lens apparatus is detachable from the camera body.

11. An image pickup apparatus comprising:
a lens apparatus;
a camera body configured to hold an image sensor, a detection unit; and
a control unit,
wherein the lens apparatus is attachable to the camera body, and
wherein the lens apparatus includes:
a first optical system;
a second optical system disposed in parallel with the first optical system; and
a lens mount unit configured to be attachable to and detachable from the camera body,
wherein each of the first optical system and the second optical system includes, in order from an object side to an image side, a first optical axis, a second optical axis, and a third optical axis,
wherein when each of the first optical system and the second optical system rotates around the third optical axis, a distance between first optical axes of the first optical system and the second optical system changes greater than a distance between third optical axes, and
wherein the detection unit is configured to detect a position of the third optical axis,
wherein the control unit is configured to move a recording pixel range of the image sensor based on the position of the third optical axis, and
wherein a minimum value of the distance between the first optical axis of the first optical system and the first optical axis of the second optical system is larger than the distance between the third optical axis of the first optical system and the third optical axis of the second optical system.

12. The lens apparatus according to claim 1, wherein each of the first optical system and the second optical system includes a first lens provided on the first optical axis, a second lens provided on the second optical axis, and a third lens provided on the third optical axis.

13. The lens apparatus according to claim 12, wherein the third lens is provided inside the lens mount unit.

14. The lens apparatus according to claim 1, wherein in each of the first optical system and the second optical system, all lenses arranged on the first optical axis, the second optical axis, and the third optical axis rotate integrally.

* * * * *